Sept. 13, 1955          L. D. BAKKE          2,717,586
INTEGRAL INTAKE MANIFOLD AND HEATERS
Filed Nov. 3, 1951          2 Sheets-Sheet 1
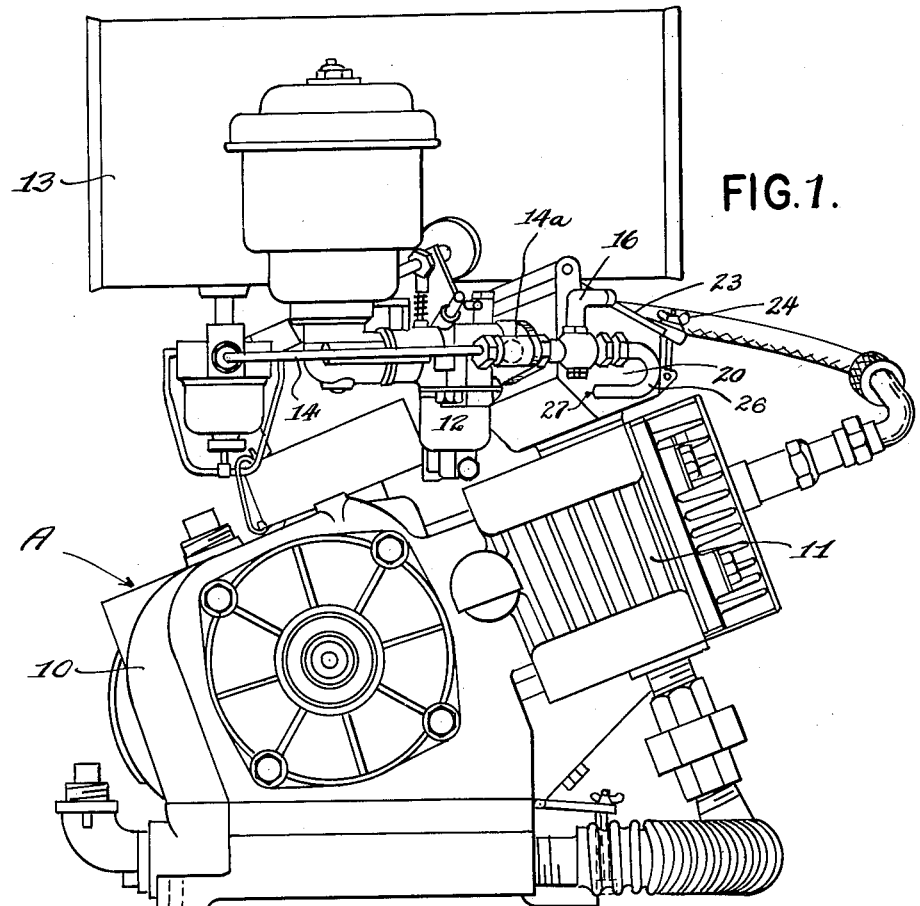
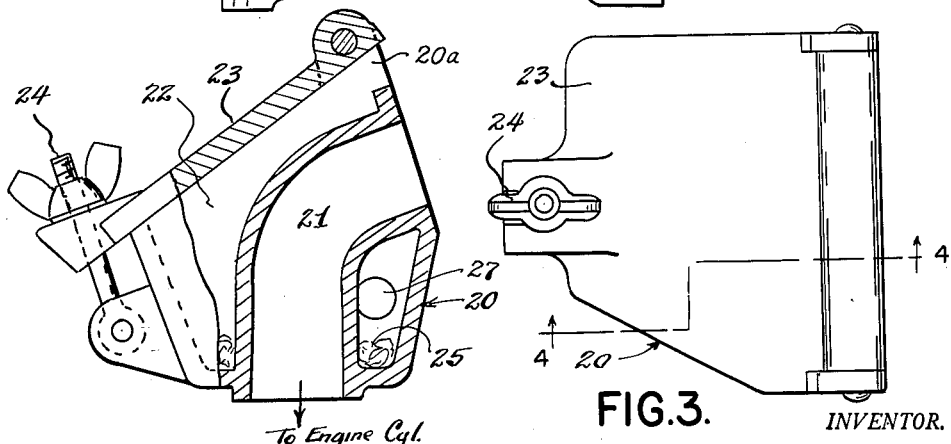
INVENTOR.
LAURENCE D. BAKKE
BY
Hawkes + Hardesty
ATTORNEYS Sept. 13, 1955         L. D. BAKKE         2,717,586
INTEGRAL INTAKE MANIFOLD AND HEATERS Filed Nov. 3, 1951         2 Sheets-Sheet 2

INVENTOR.
LAURENCE D. BAKKE
BY
*Hauke + Hardesty*
ATTORNEYS

United States Patent Office 2,717,586
Patented Sept. 13, 1955

2,717,586

INTEGRAL INTAKE MANIFOLD AND HEATERS

Laurence D. Bakke, Plymouth, Mich., assignor to Continental Motors Corporation, Detroit, Mich., a corporation of Virginia Application November 3, 1951, Serial No. 254,733

1 Claim. (Cl. 123—122)

My invention relates to internal combustion engines and more particularly to a manifold heater for such engines to particularly facilitate cold starting particularly under sub-zero climatic conditions.

In the small engine field, much difficulty has always been experienced in starting said engines under extreme sub-zero conditions, the fuel simply being precipitated out of the fuel mixture resulting in flooding the engine and seriously interfering with the starting of the engine under such sub-zero temperatures. This type of engine, usually a single cylinder engine, is normally hard to start and heat is needed to properly vaporize the gas and to maintain a good fuel mixture as supplied to the engine.

It is an object of the present invention to facilitate cold starting of an engine by supplying heat to the induction system prior to and during starting, by providing a heater which is operable for a short duration of time prior to and during starting of the engine.

It is a further object of the invention to facilitate cold starting of an engine by providing a heater box through which all the fuel mixture must pass on its way to the engine and in which liquid fuel is burned to directly heat the fuel mixture conducting means.

For a more detailed understanding of the invention, reference may be had to the accompanying drawings illustrating a preferred embodiment thereof, in which like reference characters refer to like parts throughout the several views, and in which Fig. 1 is a side elevation of an engine provided with an intake manifold heater constructed in accordance with my invention.

Fig. 3 is an elevational view of the intake manifold heater, and

Fig. 4 is a detail sectional view thereof taken on the line 4—4 of Fig. 3.

Figure 2:
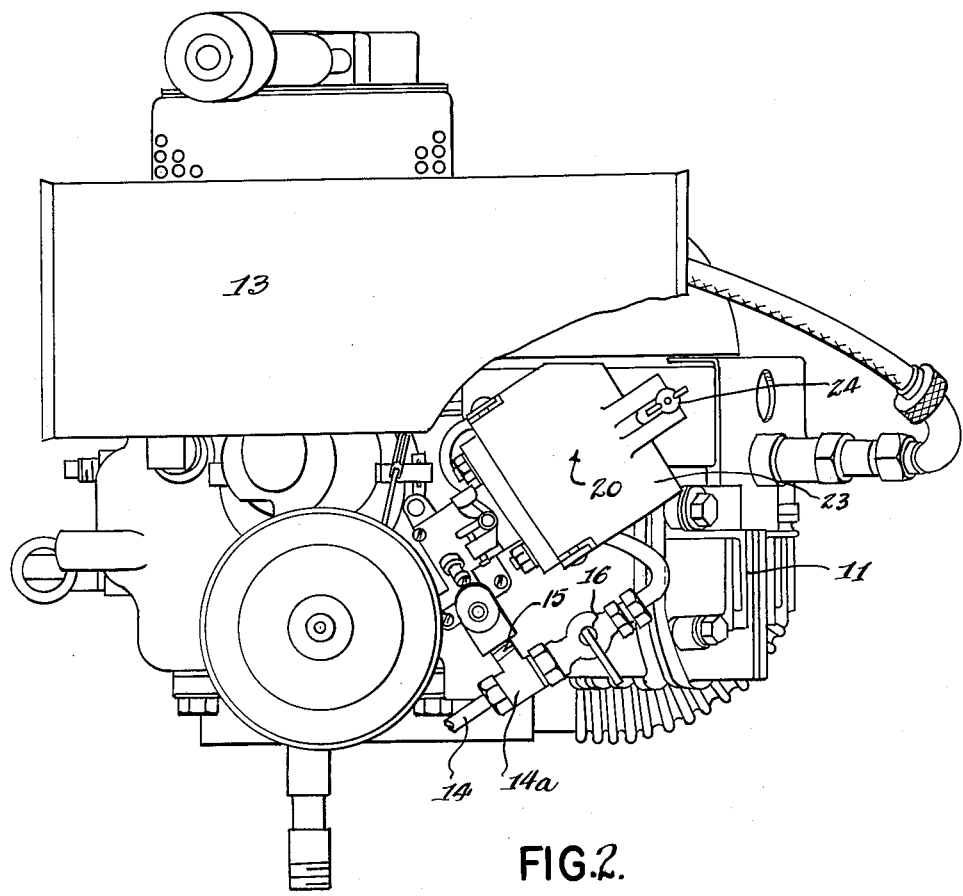
Fig. 2 is a plan view thereof.

My present invention is illustrated in connection with an internal combustion engine A of the single cylinder type, although it will be obvious that my invention may be quite satisfactorily applied as well to other types of engines of the two and four cycle type.

The illustrated engine is provided with a crankcase 10 and a cylinder 11 extending generally horizontally and slightly upwardly inclined. A carburetor 12 is located above the engine cylinder and a suitable fuel tank 13 is disposed and suitably supported above the cylinder, a fuel line 14 connecting the fuel tank with the carburetor 12. This fuel line is connected with a T-coupling 14a to which one line 15 leads to the carburetor and a valve 16 controls the flow of fuel to the intake manifold heater box 20 which is secured to the carburetor and to the engine cylinder.

This intake manifold heater box comprises a casting formed with an internal elbow-like conduit 21 open at both ends, the open ends of which are respectively connected with the carburetor outlet and the cylinder inlet port. The box provides a chamber 22 surrounding the elbow-like conduit, and the open top of this chamber is closed by the hinged cover 23, latching means 24 being utilized to lock the cover in closed position. This elbow-like conduit 21 opens through one end wall of the heater box in direct communication with the carburetor outlet and the other end of said conduit terminates in a bottom wall of the heater box in direct communication with the engine cylinder intake. The end wall of said heater box is provided with a vent opening 20a immediately above inlet end of said conduit 21. Absorbent wicking 25 is supported within the chamber about said conduit 21 and adjacent to the outlet end thereof and this absorbent wicking is adapted to be saturated with combustible liquid fuel. Any suitable fuel may be introduced into the chamber 22 to saturate this wicking, but I prefer to connect this heater box with the standard source of fuel supply by means of a tube or conduit 26 connected with the valve means 16 and which is inserted into the hole 27 in the side of the heater box, the open end of this tube opening into the chamber 22.

The valve 16 may be turned on for a short time, merely sufficient to well saturate the wicking in the box and then turned off. The saturated wicking is then ignited by any suitable means, and the fuel burns with a hot flame, these flames being impinged on the external surface of the elbow-like conduit portion 21, this directly applied heat serving to heat the intake conduit 21 and to thus prevent wet fuel precipitation from the fuel mixture conducting portion. It will be noted that the entire length of this elbow-like conduit 21 is heated, especially that portion thereof adjacent to the outlet next to the cylinder intake.

While I prefer to produce heat in the box only when preparing the engine for starting and perhaps also during starting, it will be quite apparent that, if necessary, a small amount of fuel may, by proper adjustment of the valve 16, be continuously fed into the heater box to supply same heat all during engine operation.

The heat generated in this heater box is applied for the most part to the elbow-like conduit portion 21, but since the whole heater box becomes heated, some heat at least is conducted to the carburetor and to the engine cylinder because the carburetor and engine cylinder are in direct contact with this heater box.

While I have illustrated but one form of my invention in the accompanying drawings, it will be apparent to those skilled in the art to which my invention pertains, that various modifications and changes may be made herein, without departing from the spirit of my invention or from the scope of the appended claim.

I claim:

In an internal combustion engine having a cylinder and a downdraft carburetor feeding a combustible fuel and air mixture to the engine cylinder generally downwardly, a source of fuel supply and means conducting liquid fuel from said supply to said carburetor, a heater box disposed intermediate the carburetor outlet and said engine cylinder, said heater box located directly above the engine cylinder and comprising a hollow box structure having an internal elbow conduit portion directly connecting the carburetor outlet with the engine cylinder and a chamber disposed about said elbow conduit portion, absorbent wicking disposed in said chamber about said conduit adjacent to said conduit outlet and said engine cylinder, and means selectively introducing liquid fuel into said chamber to saturate said wicking whereby to provide means for directly heating said elbow conduit on igniting the fuel saturated wicking, said box structure further comprising a casting and the conduit portion being integrally formed with said casting and comprising said elbow conduit portion opening into two adjacent surfaces of said casting extending generally normal to each other, the flame from said ignited saturated wicking impinging directly against the outer under surface of the elbow conduit portion.

References Cited in the file of this patent

UNITED STATES PATENTS

| | | |
|---|---|---|
| 673,545 | Lengel | May 7, 1901 |
| 1,236,416 | Fink | Aug. 14, 1917 |
| 1,311,417 | Roth | July 29, 1919 |
| 1,364,609 | Bowman et al. | Jan. 4, 1921 |
| 1,371,589 | Wiederwax | Mar. 15, 1921 |